United States Patent [19]
Repenning

[11] 3,975,134
[45] Aug. 17, 1976

[54] APPARATUS FOR LINING DRUMS WITH PLASTIC MATERIAL

[75] Inventor: William Repenning, Haddonfield, N.J.

[73] Assignee: Natico, Inc., Chicago, Ill.

[22] Filed: Oct. 11, 1974

[21] Appl. No.: 514,272

Related U.S. Application Data

[62] Division of Ser. No. 342,696, March 19, 1973, Pat. No. 3,893,882.

[52] U.S. Cl. ............................... 425/504; 425/388; 425/DIG. 60
[51] Int. Cl.² .................. B28B 21/36; B29C 27/22
[58] Field of Search ............ 425/387, 388, DIG. 60, 425/503, 504, DIG. 213; 264/92

[56] References Cited
UNITED STATES PATENTS

| | | |
|---|---|---|
| 2,749,572 | 6/1956 | Nowak ............................ 425/388 X |
| 3,041,669 | 7/1962 | Marshall et al. ............. 425/DIG. 60 |
| 3,137,747 | 6/1964 | Kline .............................. 425/388 X |
| 3,225,382 | 12/1965 | Hagen ........................ 425/DIG. 213 |
| 3,291,874 | 12/1966 | Negoro ........................... 425/388 X |
| 3,338,020 | 8/1967 | McGee ............................... 264/92 X |
| 3,366,019 | 1/1968 | McGee ............................ 425/388 X |
| 3,441,983 | 5/1969 | Cheney ........................... 425/388 X |
| 3,445,892 | 5/1969 | Amberg et al. ..................... 425/504 |
| 3,467,741 | 9/1969 | Kesling ........................... 425/504 X |

*Primary Examiner*—Ronald J. Shore
*Attorney, Agent, or Firm*—McDougall, Hersh & Scott

[57] ABSTRACT

Means for vacuum forming a plastic film to form a continuous liner about the interior of a drum, using the drum shell as a mold member.

8 Claims, 8 Drawing Figures

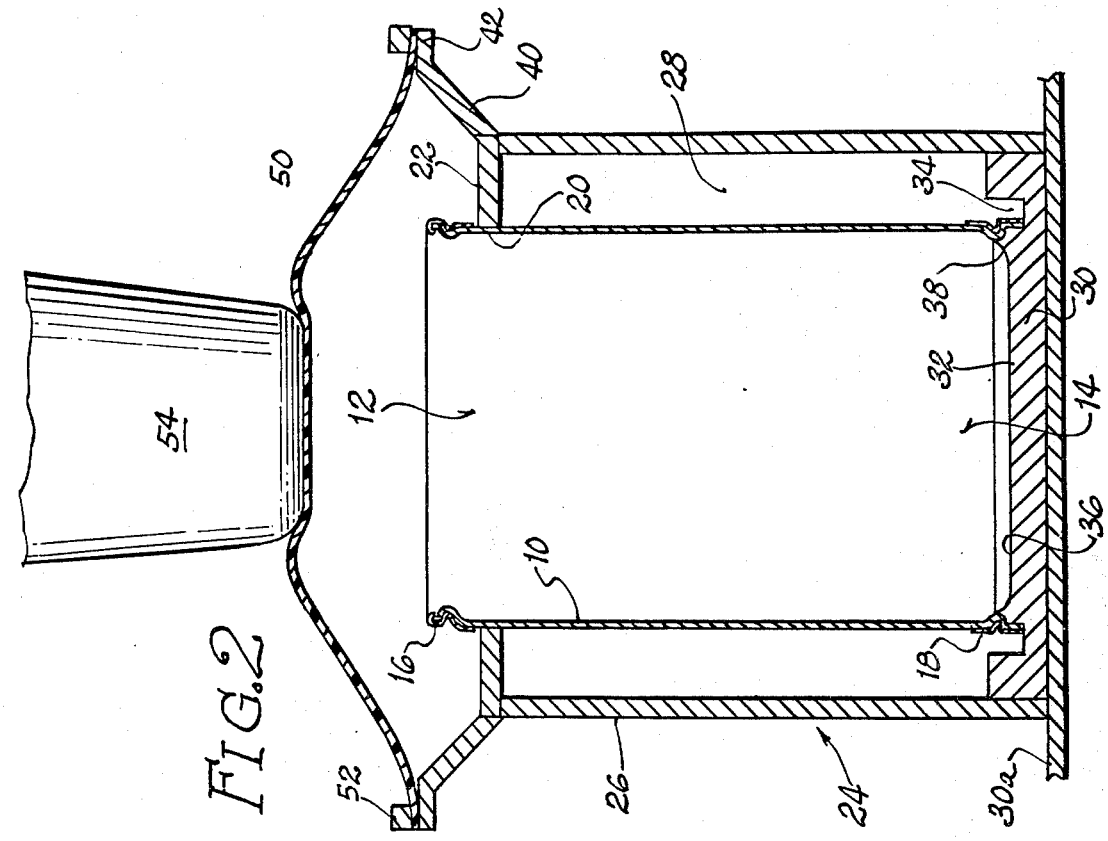
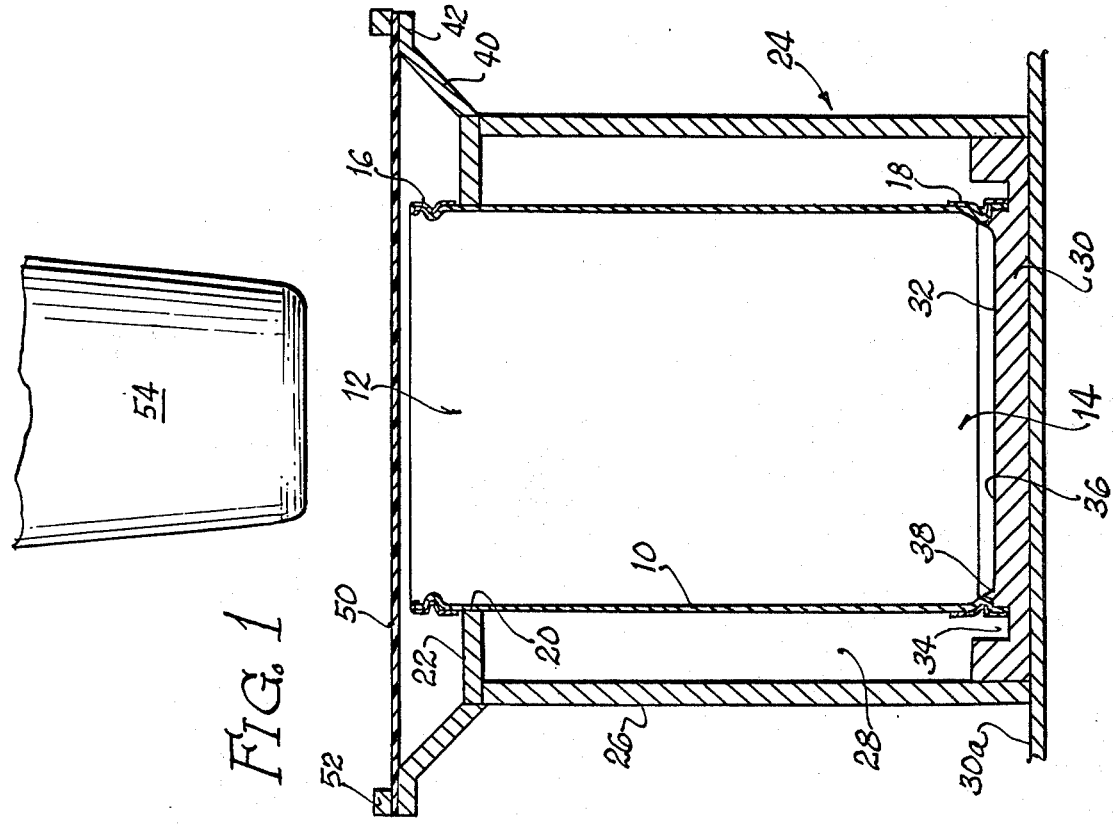

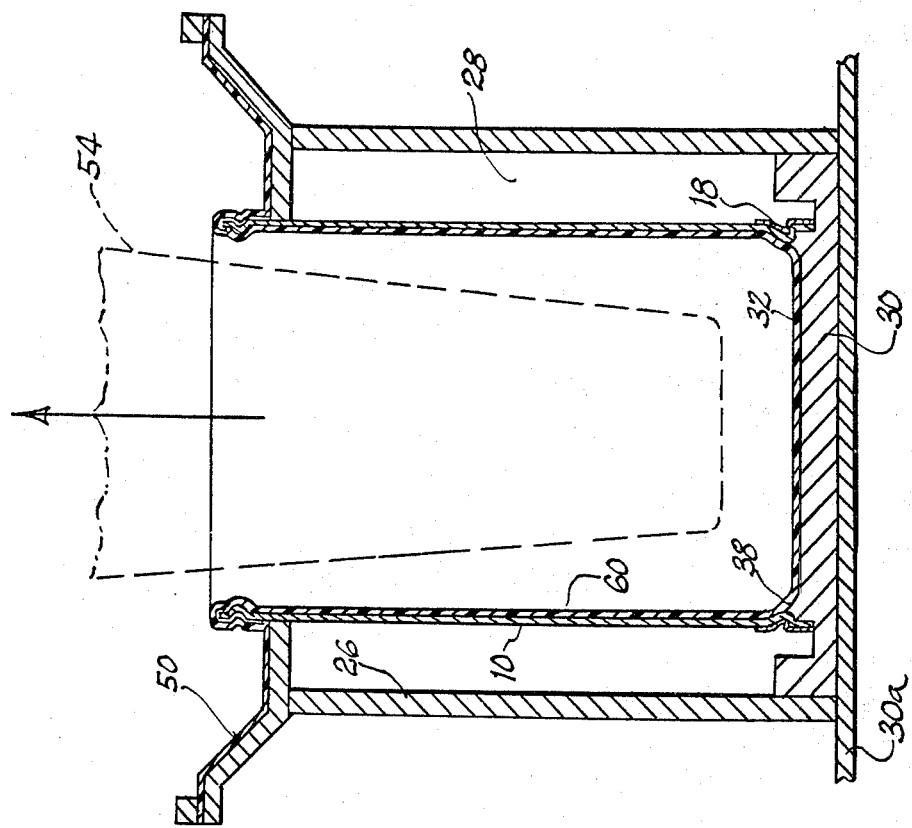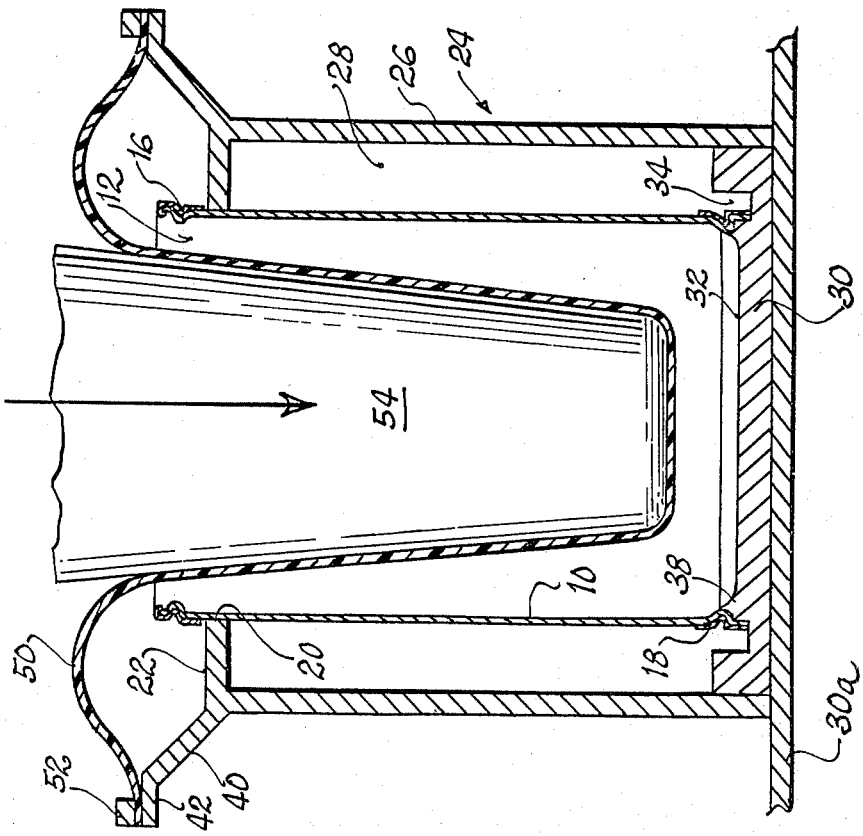

APPARATUS FOR LINING DRUMS WITH PLASTIC MATERIAL

This is a division of application Ser. No. 342,696 filed Mar. 19, 1973, now U.S. Pat. No. 3,893,882.

This invention relates to plastic lined containers and more particularly to drums of large capacity internally lined with a plastic material for use in the storage and transportation of chemicals, liquids, and semi-liquid materials.

The invention herein will be described with reference to drums of large capacity in which the structurally strong outer shell is formed of conventional materials used in the forming of fiber drums, but it will be understood that the invention includes plastic lined drums in which the shell portion is formed of other structurally strong materials, such as wood, as in a wooden barrel; metal, such as in a steel drum, and the like.

Plastic lined drums have heretofore been produced, as described in U.S. Pat. No. 3,027,044, in which the plastic liner is formed separate and apart from the drum and dimensioned to enable the liner to be inserted through the open end of the drum for receipt in fitting relation within the drum. The difficulties that have been encountered in the manufacture of plastic lined drums of the type described include the aggravations which arise from leaking liners. Such leakage gives rise to damage and loss of materials, as well as to problems generated by the escaping content materials. Such leakages find their inception not only in the preparation of the liner but in the handling of the liner from the time of its manufacture to installation in position of use in the drum.

More recently, as described in U.S. Pat. No. 3,126,797, attempts have been made to minimize the amount of handling of the plastic liner by forming the liner in situ in the drum. As described in the aforementioned patent, a tubular parison of plastic material is extruded into the open end of a tubular drum shell; the top and bottom ends of the parison are sealed; the tubular drum shell is embraced by mold walls for support; and then air is blown under pressure into the interior of the extruded parison to expand the plastic material into engagement with the mold-backed walls of the shell, whereupon a bonded relationship is established between the expanded plastic material and the shell walls.

There are a number of objectionable features to plastic lined drums produced in the manner described and to the method and means for the manufacture of same. For example, the use of air under pressure for blowing the plastic parison outwardly for expansion into engagement with the walls of the drum requires the confinement of the drum within a complex mold for support of the outer wall. Actuation of the mold into and out of engagement with the drum represents a molding operation which is expensive and time consuming, thereby to limit the number of plastic lined drums that can be produced per unit time.

The need for engagement of the walls of the drum for support necessitates a separate mold for each size and/or for each shape of drum thereby markedly to increase the number of molds required, the time and expense required for mold change, as well as the space required for inventory of such large number of molds.

The described technique requires an extrusion operation with all of its machine costs and expertness required for operation, to extrude the plastic parison into the open shell, thereby to include a molding operation as well as a forming operation in the preparation of the plastic liner.

Other problems which arise in the described method of manufacture are occasioned by the temperature of the extruded plastic material whereby considerable time is required adequately to cool down the extruded and blown plastic liner, and the need to make use of a water cooled mold to enhance the removal of heat from the expanded plastic liner with a view towards reducing the cool-down time cycle.

Finally, as described in the aforementioned patent, the plasticity of the blown liner causes the liner to become interbonded with the interior wall of the drum. The established interbonded relation interties the plastic liner to the drum shell whereby deformations or indentations of the shell, due to impact or otherwise, are directly transmitted to the inflexibly bonded liner with possible rupture or damage thereof.

It is an object of this invention to produce plastic lined drums of the type described and to provide a method and means for the fabrication of same; in which the plastic lined drum avoids many of the objections to plastic lined drums heretofore produced; in which the plastic lining is free of the drum substantially throughout whereby the plastic lining will remain intact notwithstanding damage to the drum; in which separate mold parts are not required for support of the drum during formation of the plastic lining thereby to enable fabrication of plastic lined drums of different sizes, capacities or shapes without the need for change of mold parts; in which a plastic molding operation is not required in combination with the plastic forming operation; in which cool-down can be achieved in a rapid and efficient manner thereby to minimize the time cycle for producing plastic lined drums in accordance with the practice of this invention; in which plastic lined drums can be produced in a simple and efficient manner with the need for a minimum amount of highly skilled labor, and in which a seamless, pinhole-free liner of plastic material can be formed within the drum in a low cost operation capable of continuous mass production.

These and other objects and advantages of this invention will hereinafter appear and for purposes of illustration, but not of limitation, an embodiment of the invention is shown in the accompanying drawings, in which —

FIG. 1 is a schematic elevational view showing the relative arrangement of elements in an initial stage in forming the plastic lined drum in accordance with the practice of this invention;

FIG. 2 is a schematic sectional elevational view similar to that of FIG. 1 showing the relationship of elements during an intermediate stage of forming the plastic lined drum;

FIG. 3 is a sectional elevational view showing the arrangement of elements during an intermediate state of manufacture, subsequent to the operations illustrated in FIGS. 1 and 2;

FIG. 4 is a sectional view as shown in FIGS. 1 to 3, during a final stage of expansion of the plastic to internally line the drum;

Figure 5:
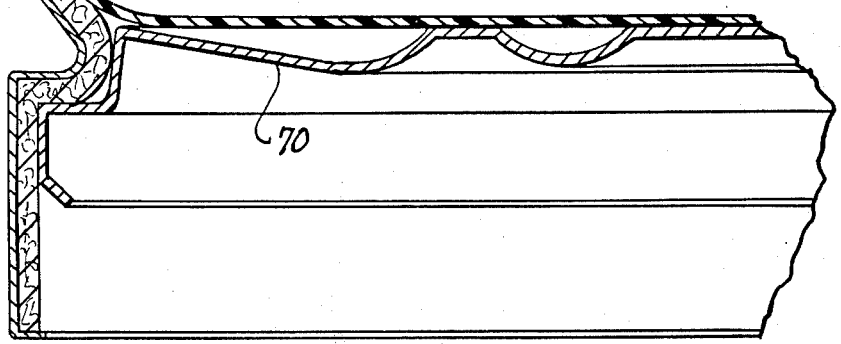
FIG. 5 is a schematic elevational view showing the arrangement of elements in a lower edge portion of the drum prior to joinder of the bottom wall of the drum to the side wall by means of a chime.

In accordance with the practice of this invention, the shell 10, which is open at the top 12 and at the bottom 14, and which forms the side wall of the completed drum D, is used as the mold. The shell 10, with the top chime 16 about the upper edge and the bottom chime 18 about the bottom edge is inserted through an opening 20 in the top wall 22 of a mold box 24. The mold box is dimensioned between side walls 26 to be greater than the dimension between the corresponding side walls of the shell 10 to provide an open space 28 therebetween while a mold pedestal or plug 30 is provided at the bottom of the box 24 on which the lower edge of the shell is received to define the bottom wall 32 of the shell mold. The plug or pedestal is provided with a recess 34 adjacent the bottom edge of the shell 10 with the recessed portion contoured to receive the free end portion of the lower chime 18 when the shell 10 is at rest on the pedestal.

The pedestal is formed with a central flat portion 36 which terminates in an upwardly and outwardly extending curvilinear portion 38 which merges into the curvilinear inwardly extending portion at the lower edge of the shell 10 and the attached chime 18. The flat portion 36 of the pedestal is adapted to be spaced from the top wall of the box 24 by an amount less than the length of the shell, preferably by an amount corresponding to the length of the upper portion to which the upper chime is attached so that the portion with the upper chime will extend outwardly beyond the top wall 22 when the shell is at rest on the pedestal. The flat portion 36 which, with the shell forms the bottom wall of the mold, is spaced below the portion of the shell normally aligned crosswise with the bottom wall of the drum by an amount calculated to correspond to the amount of shrinkage which takes place through the length of the plastic material during temperature change from plastic molding temperature to ambient temperature so that, at ambient temperature, the liner formed in the mold will freely rest on the bottom wall of the drum for support.

The box 24 is formed with an upwardly and outwardly extending flanged portion 40 which terminates in a horizontally disposed clamping lip 42. The box is provided with means for generating sub-atmospheric pressure in the space between the shell and the box with channels through the pedestal and through portions of the top wall, beyond the opening and within the flanged portions for transmitting sub-atmospheric conditions therethrough. For this purpose, one or more passages through the side wall of the box and, if desired, through the pedestal, are connected to a vacuum pump or other vacuum generating means. Means, which may include the same passages, are provided for introducing a gaseous media, such as air, into the space for purposes which will hereinafter be described.

As shown in FIG. 1, a sheet 50 of thermoplastic material of suitable thickness is arranged to overlie the box and is clamped in sealing relation at the lip 42, as by clamping means 52. For this purpose, use can be made, for example, of low, medium, or high density polyethylene, polypropylene, polyacrylic and polyalkylacrylic sheet plastics, ionomers, polystyrene, polyamides (Nylon), polyesters (Mylar), polytetrafluoroethylene (Teflon), polyvinyl homopolymers and copolymers and the like, in formulating the plastic sheet, the particular plastic material selected depending on its imperviousness and resistance to solution or attack by the chemical, liquid or other materials to be packaged in contact therewith in the plastic lined drum.

Prior sealing engagement of the thermoplastic sheet 50 in position of use, the thermoplastic sheet 50 is heated to an elevated temperature, which is above the softening point temperature but below liquefaction temperature, such as a temperature 10°–50°C above its softening point temperature. This reduces the sheet to a stretchable thermoplastic stage. Heating to elevated temperature may be accomplished by a hot air heater passing the sheet through a hot air oven, or by positioning heating elements adjacent the surface of the plastic sheet, but it is preferred to make use of a bank or infrared heating lamps which may be moved into and out of position over the mounted film for heating the plastic sheet by radiation. Instead, use can be made of such more rapid heating means as high frequency heating and the like uniformly to raise the temperature of the plastic sheet to the desired temperature range.

In order to prevent sagging or uncontrolled collapse of the plastic sheet 50 during mounting and the initial stages of the molding operation, super-atmospheric conditions are maintained within the sealed space, as by the introduction of air or other gas into the interior of the box, as by means of the passages previously described. Sufficient air or gas is introduced to cause the sheet of thermoplastic material to billow upwardly in the direction away from the interior of the mold, as illustrated in FIG. 2. More significantly, billowing the sheet outwardly an an initial step in molding provides more effective control of the stretching of the sheet to include all areas of the sheet before confinement in the mold.

In the next step for molding the liner, the top side of the sheet is engaged centrally by a plug or ram 54 which is actuated for downward displacement into the interior of the shell, preferably through the major portion of its length, but short of the bottom wall 32 of the mold. This is carried out preferably, though not necessarily, while the mold box is still being maintained under positive pressure whereby the thermoplastic sheet is retained in surface contact with the plug for deep drawing during downward displacement of the plug into the mold, as illustrated in FIG. 3. This operates to cause the plastic sheet to embrace the ram or plug 54 for positive displacement of the sheet into the interior of the shell controllably to stretch the sheet during the initial stages of the sheet forming operation. This amounts to a deep drawing step in which the major portion of the sheet molding is carried out. The deep drawing ram or plug need not be heated, but it is preferred to make use of a plug heated to an elevated temperature which corresponds to or is slightly below (up to 50°C below) the temperature of the plastic sheet so as to avoid cooling or freezing of the portions of the sheet contacted by the plug which might otherwise interfere with the desired uniform stretching of the sheet during molding or its subsequent attenuation during vacuum forming. Sections of the plug 54 can be provided, as desired, with heating or with cooling means for purposes of controlling wall thickness or the amount of stretch of the plastic material, as by cooling to minimize the amount of stretch with corresponding increase in wall thickness, or as by heating to maximize the amount of stretch with corresponding decrease in wall thickness.

The molding operation is completed by reversing the conditions existing in the cavity by replacing positive pressure conditions with sub-atmospheric or vacuum conditions. This can be achieved by communicating the interior of the mold box, through the passages, with evacuating means. This places the entire portion of the mold between the sheet and the mold box under vacuum conditions for attenuation of the sheet by vacuum forming tightly against the mold walls, including the bottom wall of the mold, the inner side walls of the shell, and about the upper chime and onto the flanged portion 22 of the mold box up to the sealing clamp, as shown in FIG. 4. The vacuum conditions can be supplemented by creating positive pressure conditions, as by blowing into the area formerly occupied by the plug.

Vacuum forming operates to draw the plastic sheet away from the plug 54, to free the plug for return to retracted position above and out of the path of the molded assembly.

When desired, the plastic sheet can be heated to a temperature sufficient to enable the plastic sheet to remain in an adhesive stage upon contact with the interior wall of the drum shell during vacuum forming to effect an interbonded relationship therewith. Under these conditions, the vacuum formed plastic sheet will function as a plastic lining 60 which conforms with the shell even during deformation or impact thereby to remain intact as a lining about the inner walls of the shell.

Such interbonded relationship between the shell and the plastic lining eliminates the need to make use of a plastic lining having strength sufficient to assume the entire support for the content material in the drum since load will be transmitted from the lining to the shell whereby the major load can be carried by the shell. Adhesion, when desired, can be enhanced by coating the interior of the shell with an adhesive material or a material which becomes more adhesive when heated to elevated temperature upon being contacted by the plastic sheet stretched into contact therewith during vacuum forming. In the alternative, when, as in the preferred practice, it is desired to avoid interbonding between the plastic liner and the shell walls, the latter can be precoated with a material that repels adhesion with the plastic lining, such as with talc, waxy lubricant, or the like.

The plastic material should be cooled down to below plastic stage before removal of the lined shell from the mold box. Cool-down can be effected by exposure to ambient conditions after vacuum forming, but it is preferred to accelerate cool-down to reduce the time cycle, as by introduction of refrigerated cool-down gases into the interior of the lined shell and mold box and/or by introducing a fog or mist of water or other low boiling fluid onto the walls of the vacuum formed plastic material whereby evaporation will extract heat from the plastic material for more rapid cool-down. Any such fluid or vapor is preferably introduced in a refrigerated state for the removal of heat both by the cold fluid and by evaporation.

In the preferred practice of this invention, use is made of a mold box and bottom wall formed of a high heat conductive material such as of a metal, as represented by aluminum, to provide structural strength as well as high heat conductivity for the removal of heat from the stretched plastic sheet. In addition, the drum or shell, which is engaged by the plastic liner, can function as a heat sink for the rapid dissipation of heat from the plastic liner to the shell. Under these conditions, cool-down can be effected in less than one minute time whereby cool-down will have little, if any, deleterious effect upon the operating cycle.

The clamping means 52 can then be removed to free the vacuum formed sheet from the mold box to enable removal of the plastic lined drum from the mold assembly.

The rim portion beyond the outer base portion of the upper chime can be trimmed for removal from the lined drum, before or after removal from the mold box, by a suitable cutting or trimming mechanism which is positioned to engage the stretched sheet at the inner peripheral edge portions of the horizontally, outwardly disposed flange of the mold box, at the base of the chime 16.

Thus there is produced a drum shell which is lined internally with a continuous film of thermoplastic material, having a bottom wall which extends continuously across the open end of the bottom of the shell, and an upper portion which extends continuously and conforms exactly to embrace the upper chime by extending upwardly about the inner wall, over the upper edge and downwardly about the outer wall of the chime to provide a continuous sealing lining which extends from the outer wall of the chime continuously about the inner wall of the container. The plastic film functions further as a protective coating over the metal chime to protect the metal chime against corrosion or atmospheric attack.

To enhance the maintenance of the lining in the assembled relation, an adhesive bond can be provided about the outer wall of the sheet at the base of the upper chime, or as a part thereof, whereby the outer edge of the vacuum formed lining will be adhesively secured to the outer wall of the drum as it is pressed tightly into contact therewith during vacuum forming. Suitable pressure sensitive or heat sensitive adhesives, which are well known to the trade, may be applied for this purpose to the chime or the portion of the drum immediately below the chime.

Figure 6:
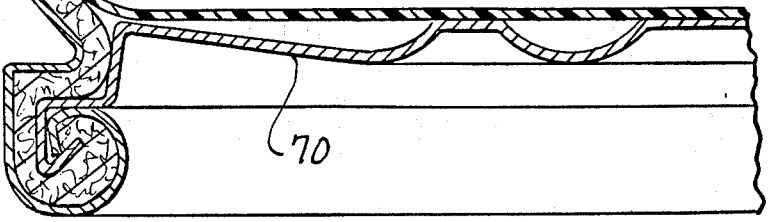
FIG. 6 is a sectional elevational view of the portion shown in FIG. 5, illustrating the completed chime.
Figure 7:
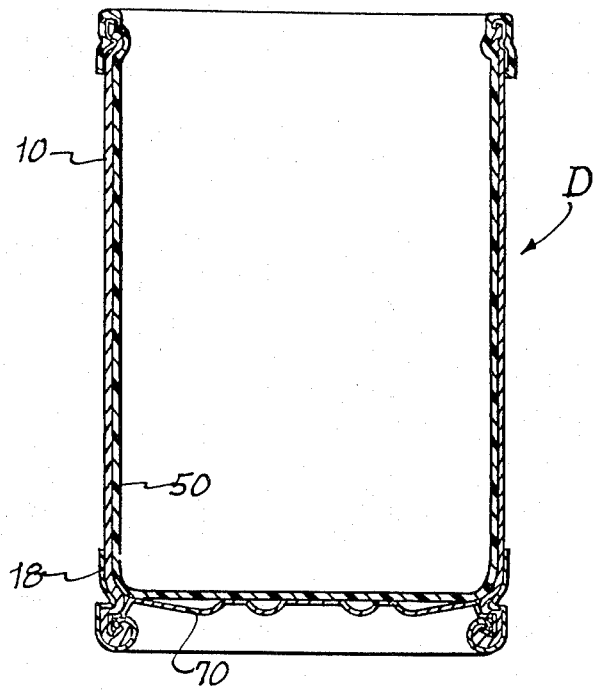
FIG. 7 is a sectional elevational view showing the plastic lined drum produced in accordance with the practice of this invention.

Upon removal of the lined shell from the mold box, the plastic lined drum is completed in the normal manner, as shown in FIGS. 5 and 6. For this purpose the bottom wall 70 of the drum is positioned adjacent the bottom open end of the shell. The bottom chime 18 is then formed about the lower edge of the shell and the outer edge flange of the bottom wall to join the bottom wall to the shell.

The amount of shrinkage that takes place upon cool-down of the vacuum formed plastic liner is calculated to correspond with the additional length provided between the bottom wall 32 of the mold and the upper chime so that the crosswise extending bottom wall of the plastic liner will rest freely on the bottom wall of the drum when the bottom wall of the drum is finally assembled onto the shell to form the continuously internally lined drum.

Figure 8:
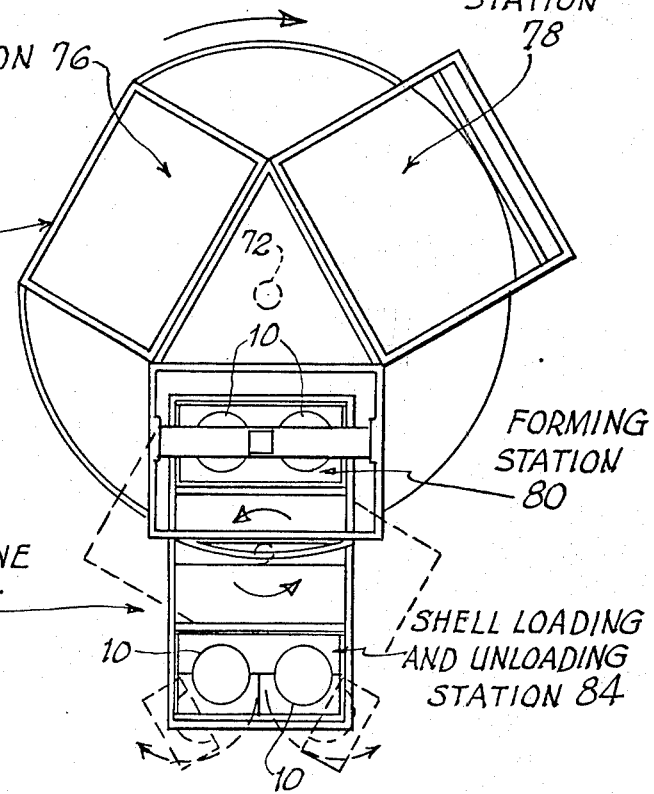
FIG. 8 is a schematic drawing showing the arrangement of stations for mass production of plastic lined drums in a manner embodying the features of this invention.

In FIG. 8, illustration is made of an arrangement for mass production of internally lined drums in accordance with the practice of this invention. In the illustrated modification, use is made of a turret 70 mounted for rotational movement about a central axis 72 with three frame members 74 of equal dimension equidistantly arranged about the axis about an equilateral triangle with the turret adapted to turn through three stages 120° apart.

At the first station 76, the sheet of plastic of predetermined dimension to fit the frame is mounted in the frame for support. The turret then rotates through an angle of 120° to position the first frame at the second station 78, where the mounted sheet of plastic material is heated, as by infrared ray lamps, high frequency heating or the like, to the desired elevated temperature for plastic molding. In the meantime another sheet of plastic material is being mounted in the frame now located at the first stage.

The turret is again rotated through an angle of 120° to position the frame with the preheated plastic sheet in mold position over the mold, as previously described, where the frame with the preheated sheet of plastic is clamped in sealing relation about the mold box and the subsequent operations are carried out for molding the plastic lining. In the meantime, a new sheet of plastic material is being mounted in the frame of the first stage and the previously mounted sheet is being preheated at the second stage.

Synchronized for movement with the turret is an indexing device 82 which is mounted for reciprocating movement between a molding station 80 and a loading-unloading station 84. The indexing device is formed with two sets of mold boxes arranged 180° apart so that one set will be located at the molding station while the other set is at the loading-unloading station.

The molding station 80 coincides with the third station of the turret which brings the frame mounted thermoplastic sheet in a preheated state in position to overlie the mold boxes in the molding station where the sheet is clamped in sealing relation to the box and the described molding operations are carried out. In the meantime, the other set of mold boxes are located at the loading-unloading station where the shells previously lined at the molding station are removed and replaced by unlined shells.

When the molding operation has been completed, the indexing device is reciprocated to bring the mold boxes with the lined shells to the loading-unloading station for unloading the lined shells and reloading with unlined shells while the previously loaded shells are having the lining formed therein.

In the illustrated modification, the indexing device is formed with two mold boxes in side by side relation to mold two shells at a time. For this purpose, the frame is dimensioned to correspond to the length and width of the combined mold boxes so as to support a sheet of plastic material which spans the open ends of both shell molds for sealing engagement with the lips thereof. It will be understood that the system can be adapted to the use of a single set of mold boxes at each station or for more than two sets of mold boxes with corresponding change in the frame dimension and length and width of the sheet of thermoplastic material processed in the turrett.

It will also be understood that the turrett may be provided with more or less stations such as two or more preheating stations and the like.

While, in the preferred practice of this invention, use is made of a mold box for support of the shell wherein the molding operations are carried out, the walls 26 of the mold box are not essential as long as means such as connecting rods are provided for maintaining the desired spaced relation between the flanged portion 22 and skirt and lip 40–42 and the bottom plug 30 as supported by the bottom wall 30a and as long as means are provided to maintain an effective sealing relation between the outer wall of the shell 10 and the inner edge of the flange 20. Under these circumstances sufficient sub-atmospheric conditions can be maintained in the area between the stretchable plastic liner and the shell as well as between the stretchable plastic liner and the flanged portion 22–40 to effect vacuum molding of the stretchable plastic sheet to conform with the interior of the shell and snugly to engage about the upper chime to embrace the adjacent portion of the flange 22.

It will be apparent from the foregoing description that the described method and apparatus for vacuum forming of a plastic sheet, using the drum shell as a part of the mold surface, provides for complete lining of the drum without exposing the lining to elements which might otherwise cause rupture or improper lining of the drum. The described method and apparatus provides for a more relaxed lining which can depend upon the drum for support thereby to enable increased resistance to load or impact during use and to provide a lined drum in which the lining extends continuously about the interior of the drum and upwardly about the upper chime to insure complete portection from the content material to be loaded into the drum, notwithstanding the position of the drum during movement from station to station or during storage and transportation of the loaded drum.

Numerous other advantages are derived from a lined drum produced in accordance with the practice of this invention, including low cost, mass production in a continuous operation, automation which minimizes the need for skilled labor, lining of the drum concurrently with drum manufacture thereby to eliminate the need for separate manufacture, storage, transportation and assembly of plastic liners.

Significantly, the method and apparatus of this invention, which makes use of the shell of the drum as the mold element, eliminates the need for separate molds to form linings for differently sized drums. Shells of different sizes and/or shapes, such as round, square, octagonal, oblong and the like, can be adapted for use with the same size mold box thereby to enable a single size mold box to be employed for plastic lining differently sized or shaped drums. This flexibility in operation makes it more practical to adapt the described operation to a continuous process, such as in the turret arrangement described for vacuum forming a plastic liner in the manufacture of plastic lined metal or fiber drums.

Another significant factor which is instrumental in the economic and efficient manufacture of plastic lined drums resides in the fact that the mold, as represented by the drum shell, is replaced with the removal of each plastically lined shell with the result that the heat present in the plastic material is carried out of the machine with the shell.

The utilization of high heat conductive material such as aluminum or other metals for the bottom wall of the mold as well as in the mold box permits metallic cooling of surfaces of the plastic sheet material at points of greater thickness to enhance cool-down and plastic forming of the drum lining.

It will be apparent from the foregoing that a new and improved method and means are provided for the manufacture of plastic lined metal or fiberboard drums having improved characteristics in use.

It will be understood that changes may be made in the details of construction, arrangement and operation without departing from the spirit of the invention, especially as defined in the following claims.

I claim:

1. Apparatus for molding a plastic film into a drum shell open at the top with a chime about the upper edge of the shell and open at the bottom to form a liner which remains a part of the drum shell whereby the drum shell functions as its own mold surface during the molding of the liner therein, comprising an outer frame having an opening with a diameter greater than the diameter of the shell and adapted removably to receive the shell therein with the outer frame spaced from the shell to provide an annular space therebetween and a pedestal adjacent the bottom of the frame on which the shell rests as a bottom wall to close the open bottom end of the shell, an annular flange adjacent the upper end portion of the frame and extending inwardly for a distance substantially to engage the outer wall of the shell a short distance below the chime, another annular flange extending outwardly from the upper end portion of the frame and upwardly to a level above the upper edge of the frame, clamping means for said outwardly extending annular flange portion for engaging a plastic film in sealing engagement over the open end of the shell, means associated with the frame for heating a thermoplastic film to the plastic stage, means for drawing a vacuum within the frame for generating vacuum conditions therein when the plastic film is secured in sealing relation to the frame, whereby the plastic film is drawn outwardly into engagement with the inner wall of the shell, and means communicating the space above said inwardly extending flange and said outwardly extending flange and below the sealed film with said means for drawing a vacuum to draw the portion of the film outwardly of the shell downwardly against the outerwall portion portion of the shell above the inwardly extending flange to wrap the film about the open upper end portion of the shell whereby the film lines the inner wall of the shell and is wrapped about the upper edge of the shell and about the chime to form a permanent plastic lined shell.

2. Apparatus as claimed in claim 1 which includes reciprocable means on which the frame is mounted for reciprocal movement between molding position and loading and unloading position, a turret means cooperating with said reciprocable means for movement of the plastic film between mounting position, preheating position and molding position, and in which said reciprocating means and turret means are coordinated to position a plastic file in molding position when the mold frame is reciprocated from loading position to said molding position.

3. Apparatus as claimed in claim 1 in which the pedestal is positioned with its top wall spaced below the lower edge of the shell by an amount corresponding to the lengthwise shrinkage of the stretched film during cool-down from molding temperature to ambient temperature.

4. Apparatus as claimed in claim 1 which includes means for heating the ram to elevated temperature.

5. Apparatus as claimed in claim 1 which includes means for blowing air into the interior of the frame for billowing the plastic film upwardly after it has been mounted in sealing relation but prior to molding.

6. Apparatus as claimed in claim 1 which includes means for blowing air into the interior of the frame outwardly of the film, during vacuum forming to assist in conforming the plastic film to the interior walls of the shell.

7. Apparatus as claimed in claim 1 in which the frame is in the form of a box having vertical walls spaced by an amount greater than the space relation between the vertical walls of the shell to provide a spaced relationship therebetween when the shell is in position of use as a mold member within the box, and in which the inwardly extending flange is at the upper end portion of the box while the pedestal forms the lower wall of the box, and which includes means communicating the interior of the box with means for withdrawal of air from within the box.

8. Apparatus as claimed in claim 1 which includes a ram mounted for movement axially into and out of the frame between retracted position beyond the upper end of the frame and operative position within the frame.

* * * * *